May 9, 1933.  J. R. WARREN  1,907,631
VALVE STRUCTURE
Filed Nov. 20, 1930  3 Sheets-Sheet 2
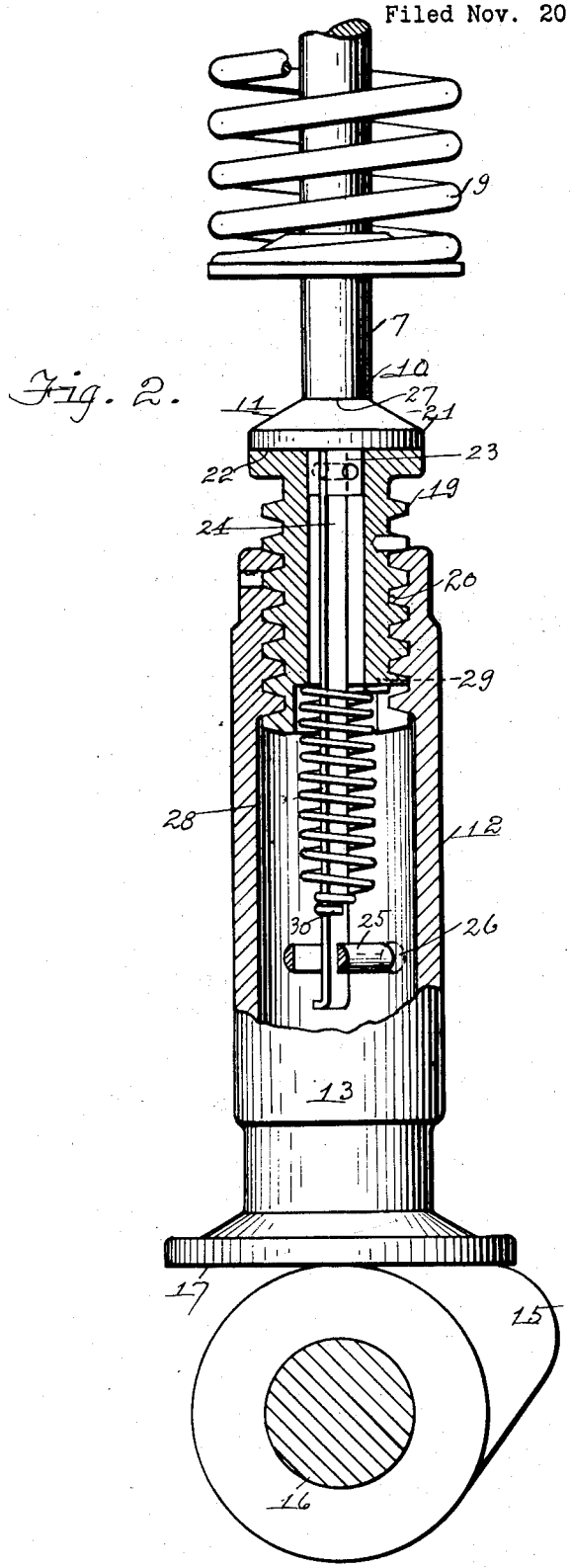
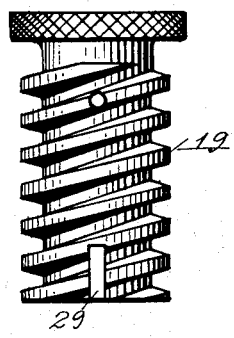
INVENTOR.
John R. Warren
BY
Rice and Rice
ATTORNEYS.

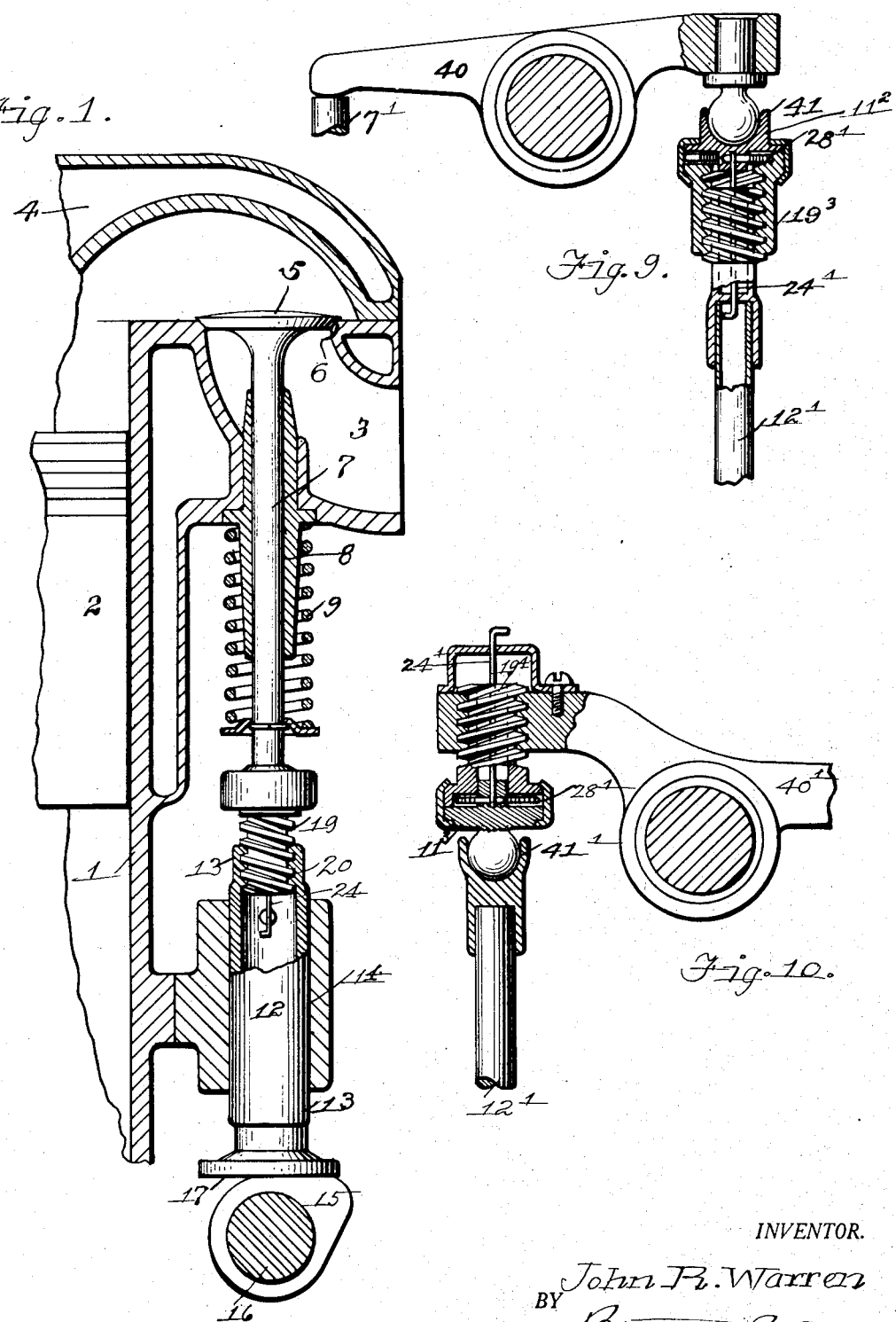

May 9, 1933.  J. R. WARREN  1,907,631
VALVE STRUCTURE
Filed Nov. 20, 1930   3 Sheets-Sheet 3
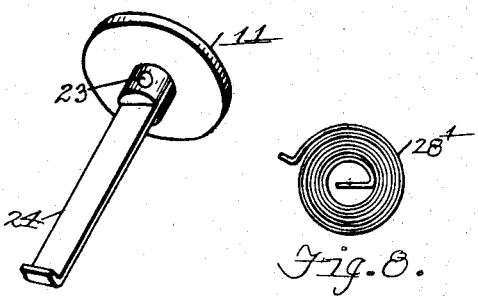
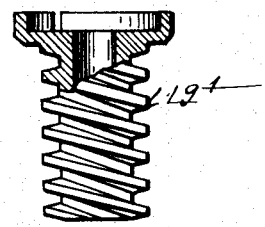
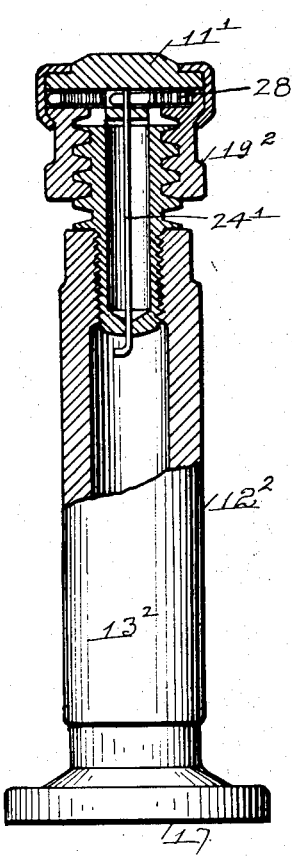
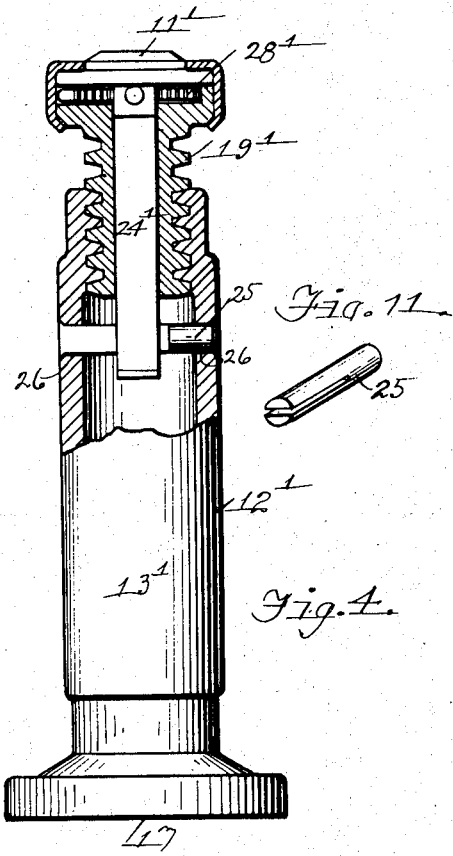
INVENTOR.
John R. Warren
BY Rice and Rice
ATTORNEYS.

Patented May 9, 1933

1,907,631

UNITED STATES PATENT OFFICE

JOHN R. WARREN, OF GRAND RAPIDS, MICHIGAN

VALVE STRUCTURE

Application filed November 20, 1930. Serial No. 496,869.

The present invention relates to valve structures, such as the puppet valves of internal-combustion engines, and its object is, generally, to provide improved means for operating such valves; and more particularly, to provide improved means for automatically adjusting the valve stems and the tappets or valve-lifters of such valves in operative engagement with each other and maintaining the same in such engagement, thus securing a perfect adjustment of, and the improved and quiet operation of, such parts.

These and any other and more specific objects hereinafter appearing are attained by, and the invention finds preferable embodiment in, the illustrative structures hereinafter particularly described in the body of this specification and illustrated by the accompanying drawings, in which:

Figure 1 is an elevational view of a portion of the cylinder of an internal-combustion engine, its valve, and valve-operating parts, shown partly in vertical axial section;

Figure 2 is a view (enlarged) of certain of the parts thereof shown partially in vertical axial section;

Figure 3 is a side view of a threaded member thereof;

Figure 4 is a side view of certain parts of such a structure, shown partially in axial section and illustrating a modfied construction;

Figure 5 is a side view (partially sectioned axially) of the threaded member of said modified construction;

Figure 6 is a side view of certain parts of such a structure, shown partially in axial section and illustrating another modified construction;

Figure 7 is a view in perspective of a rotatable member of the structure and a spring connected thereto;

Figure 8 is a plan view of a flat spiral spring;

Figure 9 is a side view of certain parts of such a structure, shown partially sectioned and illustrating still another modified construction;

Figure 10 is a side view of certain parts of such a structure, shown partially sectioned and illustrating still another modified construction; and Figure 11 is a view of a spring-retaining pin.

In Figure 1 of these drawings is illustrated portions of an internal-combustion engine, such as are employed in automobiles, having the engine cylinder 1, piston 2 therein, intake or exhaust passage 3, water jacket 4 and puppet valve controlling said passage having the valve head or valve proper 5 seating in the valve seat 6 and provided with a valve stem 7 sliding in a bearing 8. This valve is pressed to its seated position by a coiled spring 9 surrounding the valve stem, and is moved to its open position by the following means:

The valve stem, or axially movable elongated element 7, abuts at its lower end 10 (see Figure 2) on the upper side of a member 11 of a tappet or valve-lifter designated generally 12 and comprising the elongated element 13 slidably movable coaxially with the valve stem in a bearing 14, and being thus moved to unseat the valve by suitable actuating engine-operated mechanism as the cam 15 on the shaft 16, said cam engaging the lower end or face 17 of said element 13.

An axially hollow helical member 19 threaded at 20 in the axially hollow element 13 (and having preferably double threads) is turnable about the axis thereof upwardly or outwardly toward the valve stem or element 7 until the upper side 27 of the member 11 abuttingly engages or contacts the lower end 10 of element or valve stem 7 as seen in Figure 2 wherein the valve is seated and the tappet 12 and its element 13 are in lowest position. The member 11 is in form a round disk bearing at its lower side 21 on the upper end 22 of the helical member 19 and turnable thereon about the axis of said elements, and has secured to its under side at 23 a spring 24 extending downwardly through the member 19 and the element 13 to a point of attachment with said element as by means of the split pin 25 extending diametrically through holes 26 in said element's sides.

It will be seen that there is no space between the vertically disposed parts and that when the tappet is raised by the cam 15 the valve stem or element 7 is at once lifted to unseat the valve. This contacting or abutting engagement of the member 11 and valve stem 7 is automatically brought about and maintained in the following manner and by the following means:

The helical member 19 is turnably urged outwardly or upwardly to cause member 11 to contact the end of the valve stem by a torsional spring 28 whose upper end is seated in a slot 29 in the bottom of member 19 and whose lower end is fastened at 30 to the flat spring 24, this spring 28 being tensioned to turn said member 19 thus outwardly.

Supposing that in assembling the parts, the helical member 19 be turned downwardly or inwardly to such a position (tensioning the spring 28) as will leave a slight gap or space between member 11 and the valve stem (the valve being pressed by its spring 9 to seated position, i. e. to the limit of the valve stem's movement downwardly), the torsional spring 28 will turn the helical member 19 outwardly to cause the disk member 11 to contact the end of the valve stem, whereupon the rotation of shaft 16 will cause the cam to open the valve. This helical member will turn reversely very slightly in the valve-opening operation because the frictional pressure (exerted by spring 9) between the under side 21 of disk member 11 and the upper end 22 of the helical member 19 cooperates (to resist the reverse turning of said member) with the resisting action of spring 24. The coiled spring 28 alone is not stiff enough to resist this reverse turning of helical member 19.

Supposing that in assembling the parts (or in any way) the helical member 19 be turned outwardly or upwardly so far that the valve is held out of seating position although the element 13 is in its lowest position, the parts will nevertheless automatically adjust themselves by the running of the engine, so that the valve will soon seat when the element 13 is in its lowest position.

The above results are brought about by the successive jars caused by the vibration of the running engine and the movements of the valve, etc. whereby the contact between disk member 11 and helical member 19 is intermittently broken and the friction between them interrupted or suspended so that by slight successive degrees the helical member turns reversely and the valve is brought to seating position.

When the valve is thus permitted to seat, the spring 24 turns disk member 11 to normal position and the spring 28 exerts its function.

The spring 24 is stronger or stiffer than the spring 28. The pitch of the threads of the helical member 19 and the strength or stiffness of the springs should, of course, be so relatively proportioned as to bring about the actions and results above described.

It will be seen that the valve stem and the tappet will thus be maintained in constantly contacting operative relation, thus obviating the noise occurring in prior devices of this character in which the adjacent ends of the stem and tappet are so adjusted as to provide a slight space or gap between them to accommodate expansion caused by heat, the absence of such a space in these prior devices resulting in a slight unseating of the valve when its stem lengthens by heat expansion.

In the modified constructions shown in Figures 4, 6, 9 and 10 the spring $28^1$ corresponding to spring 28 in Figure 2 is in form a flat spiral spring connected at one end to the helical member $19^1$ and at the other end to the flat spring $24^1$ corresponding to the similar spring 24 in Figure 2. In Figures 9 and 10 a rocker arm 40, $40^1$ is shown one of its ends being operated by the push rod or tappet $12^1$ and its other end operating the valve stem $7^1$. Somewhat differing forms of the helical member are seen at $19^1$, $19^2$, $19^3$ and $19^4$ in these views of modified constructions, and ball and socket connections 41, $41^1$ are shown in Figures 9 and 10, different forms of the disk member 11 appearing at $11^1$ in Figures 4 and 6, and $11^2$ and $11^3$ in Figures 9 and 10.

The invention being intended to be pointed out in the claims, is not to be limited to or by details of construction of the embodiments thereof illustrated by the drawings or hereinbefore described.

I claim:

1. In a valve structure of the character described, means for moving the valve from one of its positions comprising: actuating mechanism; elongated elements operatively intermediate such mechanism and the valve and movable in the direction of their axis; a member in threaded relation with one of said elements and turnable about said axis; a spring urging said member turnably toward the other element; a second member intermediate the threaded member and said other element, spacing the same apart and bearing on the threaded member turnably about said axis; a torsion spring tensioned by the second-mentioned member's turning movement.

2. In a valve structure of the character described, means for moving the valve from one of its positions comprising: actuating mechanism; elongated elements operatively intermediate such mechanism and the valve and movable in the direction of their axis; a member in threaded relation with one of said elements and turnable about said axis; a spring urging said member turnably toward the other element; a second member intermediate the threaded member and said other element, spacing the same apart and bearing on the threaded member turnably about said axis; a torsion spring tensioned by the second-mentioned member's turning movement, the second-mentioned spring being stronger than the first-mentioned spring.

3. In a valve structure of the character described, means for moving the valve from one of its positions comprising: actuating mechanism; elongated elements operatively intermediate such mechanism and the valve and movable in the direction of their axis; a member in threaded relation with one of said elements and turnable about said axis; a spring urging said member turnably toward the other element; a second member intermediate the threaded member and said other element, spacing the same apart and bearing on the threaded member turnably about said axis; a torsion spring tensioned by the second-mentioned member's turning movement, the springs urging said members respectively in the same direction.

4. In a valve structure of the character described, means for moving the valve from one of its positions comprising: actuating mechanism; elongated elements operatively intermediate such mechanism and the valve and movable in the direction of their axis; a member in threaded relation with one of said elements and turnable about said axis; a spring urging said member turnably toward the other element; a second member intermediate the threaded member and said other element, spacing the same apart and bearing on the threaded member turnably about said axis; a spring tensioned by the second-mentioned member's turning movement, one of said springs being mounted at one end on the other spring.

5. In a valve structure of the character described, means for moving the valve from one of its positions comprising: actuating mechanism; elongated elements operatively intermediate such mechanism and the valve and movable in the direction of their axis, one of said elements being hollow; a hollow member threaded in the hollow element and turnable about said axis; a spring within the hollow element, connected thereto and to said member and urging said member turnably toward the other element; a second member intermediate the threaded member and said other element, spacing the same apart and bearing on the threaded member turnably about said axis; a spring inside said hollow element and the hollow member, connected to the hollow element and the second-mentioned member urging the second-mentioned member turnably.

6. In a structure of the character described: a puppet valve; a spring pressing the same to closed position; means for moving the valve to open position including actuating mechanism, a tappet operatively intermediate such mechanism and the valve and comprising separate elements movable together and also relatively, a member in threaded relation with one of said elements and turnable to operative engagement with a second member hereinafter mentioned, a spring for thus turning the first-mentioned member, the first-mentioned spring being stronger than the second-mentioned spring so that the second-mentioned spring will be made to yield by the impulsive movement of said mechanism sufficiently to permit the first-mentioned spring to press the valve to seated position in the inoperative position of such mechanism, said means including also a second member intermediate the threaded member and said other element, spacing the same apart and bearing on the threaded member turnably about their axis, and means for yieldingly resisting the turning movement of the second-mentioned member.

In testimony whereof I have hereunto set my hand at Grand Rapids, Michigan, this 17th day of November, 1930.

JOHN R. WARREN.